Dec. 15, 1925.
A. POSTAL
1,565,292
DOOR FASTENER ATTACHMENT FOR LOCKS
Filed June 19, 1924
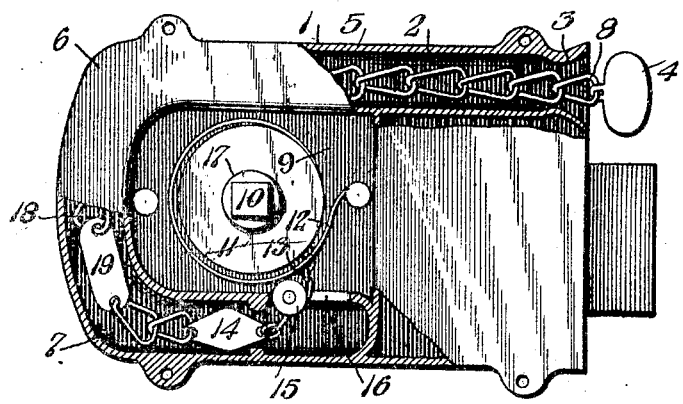
Fig. 1.
Fig. 2.
Fig. 3.
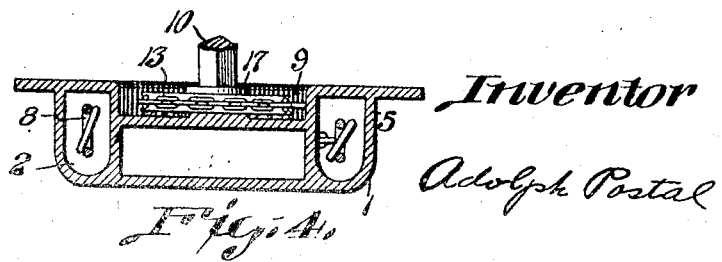
Fig. 4.
Inventor
Adolph Postal Patented Dec. 15, 1925.

1,565,292

UNITED STATES PATENT OFFICE.

ADOLPH POSTAL, OF CHICAGO, ILLINOIS.

DOOR-FASTENER ATTACHMENT FOR LOCKS.

Application filed June 19, 1924. Serial No. 721,116.

*To all whom it may concern:*

Be it known that I, ADOLPH POSTAL, a citizen of the United States, residing at Chicago, Cook County, State of Illinois, have invented a new and useful Door-Fastener Attachment for Locks, of which the following is a specification.

The invention relates to improvements in door fastener attachments for locks, in which a safety chain is enclosed in the casing of a lock, means of tension are provided to keep said chain within the lock when not in use.

A flat link is linked among the links of the safety chain and it is manually engaged in a slotted socket mounted on the lock-catch, and attached to the door sash. The door must be brought to a closed position to disengage said flat link from the socket; and the objects of the improvement are, to provide means that the door can be opened a few inches and still be safely locked, to provide a container for the safety chain, within the casing of a lock, and keep it there by means of tension, to prevent its interference with the operation of the door, the safety chain enclosed within the lock improves its general appearance.

One form of the invention is illustrated by the accompanying drawing, in which, Figure (1) is the back view of the lock, partly in section to afford a better illustration. Figure (2) is the front view of the lock-catch. Figure (3) is the side view of lock-catch. Figure (4) is the sectional view of the lock.

The casing of a lock (1) having a groove (2) around its mechanism a socket (3) is mounted on the opening of the groove (2) the groove is formed in the upper casing (5) and it is covered by the bottom casing (6) the said groove is clean of any obstruction provided with round corners (7) to maintain a free movement of the transversing safety chain (8) the purpose of the socket (3) is to prevent the inner end of the safety chain (8) from withdrawing from its container, the safety chain is also provided with a stop (4) on its outer end.

A recess (9) is formed in the bottom casing (6) around the connecting rod (10) within said recess (9) a pulley (11) and a coiled spring (12) are mounted therein, a small chain (13) is wound around said pulley (11) one end of it is coupled with the pulley (11) and the other end is linked with a coupling stop (14) the small chain (13) moves on a roller (15) passing the opening (16) between the grooves (2) and the recess (9). The pulley (11) rotates clockwise on an extended hub (17) around the connecting rod (10) which forms its axis, the said pulley (11) is maintained in tension by the coiled spring (12) which is wound against the movement of the pulley (11) said pulley (11) and coiled spring (12) can be placed within the lock providing its interference with the mechanism is avoided.

Among the multitude of links (18) of the safety chain, a flat link (19) is linked and located near the inner end of the safety chain, said flat link is manually inserted in a slotted socket (20) which is mounted on the lock-catch (21) and disengaged in the same manner.

The coiled spring (12) is wound in a flat position and placed beneath the pulley (11) one end is fastened to the pulley (11) the other end is attached to the casing. The coiled spring (12) is crimped tight when the safety chain (8) is pulled out from its container. When the safety chain (8) is left loose the coiled spring (12) rewinds moving the pulley (11) in the opposite direction, meanwhile pulling the safety chain (8) into the groove. The small chain (13) serves a connection between the means of tension and the safety chain (8).

To operate the safety chain, the door must be at a closed position, the chain is pulled out from its container, the flat link is inserted in the slot of the socket, the chain is then pulled back by its own tension, the person can open the door a few inches and still be safely locked. To disengage the flat link the door is brought to a closed position, otherwise the withdrawing of the chain is impossible.

The slotted socket combined with the lock-catch is made of malleable iron or any other metal of similar type, which shall prevent its breakage intentionally, the links of the safety chain are turned out as small as possible, to keep it flexible, and to assure a free movement within the groove formed around the mechanism, and furthermore, not to enlarge the lock exceedingly.

I am aware that prior to my invention, door fasteners in form of a safety chain were used before, but they were not so arranged or used in combination with a lock, therefore I shall claim as follows.

What I claim is:

1. A device of the class described comprising in combination a lock, a safety chain movable within a groove, said groove being formed around the latching mechanism of the lock, and being covered by the bottom casing, means for urging the safety chain into the interior of said groove, a socket is provided at the opening of the groove, thereby preventing the withdrawal of the all safety chain, said safety chain being provided with a flat link which works in conjunction with a slotted socket mounted on the lock-catch.

2. A receptacle being enclosed within the casing of a latching device, said receptacle containing a door safety chain, means of tension being provided to pull said safety chain into the interior of said receptacle, one member of said safety chain working in conjunction with another member mounted on the lock-catch, thereby permitting the door to be opened a few inches and still be safely locked.

3. A lock having a groove around its latching mechanism, a socket at the opening of said groove being provided in the casing, a safety chain with stops on both ends traversing within said groove, a pulley under tension maintained by a coiled spring, a small chain wound around said pulley, a coupling stop connecting the small chain with the original safety chain, said pulley and means of tension are placed in a recess, formed in or outside of the lock.

4. In a latching device a socket is mounted on the lock-catch, said socket is slotted, the round opening of the said socket corresponds with the thickness of the safety chain, traversing within said socket, when the safety chain is in operation, said slot on the socket is provided, to receive the flat link of the safety chain, said lock-catch is mounted on the door sash.

5. A latching device having an auxiliary door fastener attached to it, the door fastener permits to open the door a few inches and still be safely locked, means are provided to engage said door fastener when the door is closed, and disengage it while having the door at the same position.

6. In a door safety chain among the plurality of links, a flat link is provided near its inner end, a socket with a slot in it is mounted on the door sash to receive said flat link, the flat link is manually engaged and disengaged.

ADOLPH POSTAL.